United States Patent [19]
Krüeger

[11] Patent Number: 4,907,411
[45] Date of Patent: Mar. 13, 1990

[54] INTERNAL COMBUSTION CHAMBER ARRANGEMENT

[75] Inventor: Wolfgang Krüeger, Reichertshausen, Fed. Rep. of Germany

[73] Assignee: MTU Motoren-und Turbinen-Union Muenchen GmbH, Munich, Fed. Rep. of Germany

[21] Appl. No.: 201,367

[22] Filed: May 26, 1988

Related U.S. Application Data

[63] Continuation of Ser. No. 870,371, Jun. 4, 1986, abandoned.

[30] Foreign Application Priority Data

Jun. 4, 1985 [DE] Fed. Rep. of Germany ....... 3519938

[51] Int. Cl.⁴ .......................... F23R 3/06; F23R 3/60
[52] U.S. Cl. ..................................... 60/753; 60/39.32; 431/165; 431/190
[58] Field of Search .................. 60/753, 754, 755, 757, 60/758, 760, 39.32; 431/164, 165, 190; 126/146; 110/175 R, 182

[56] References Cited

U.S. PATENT DOCUMENTS

| | | | |
|---|---|---|---|
| 2,544,538 | 3/1951 | Mahnken et al. | 60/39.32 |
| 3,956,886 | 5/1975 | Sedgwick | 60/753 |
| 4,422,300 | 12/1983 | Dierberger et al. | 60/757 |

*Primary Examiner*—Louis J. Casaregola
*Assistant Examiner*—Timothy S. Thorpe
*Attorney, Agent, or Firm*—Barnes & Thornburg

[57] ABSTRACT

A combustion chamber arrangement for gas turbine propulsion units with a flame tube of ceramic material which is surrounded by a metallic wall while leaving free an intermediate space; the flame tube is composed of ring-shaped parts whereby sheet metal mounting members are so arranged between the outer walls of which and the metallic walls, especially of a housing without heat contact to the parts of the flame tube that a first and a second intermediate space for peripheral partial flows of cooling air is formed.

13 Claims, 5 Drawing Sheets

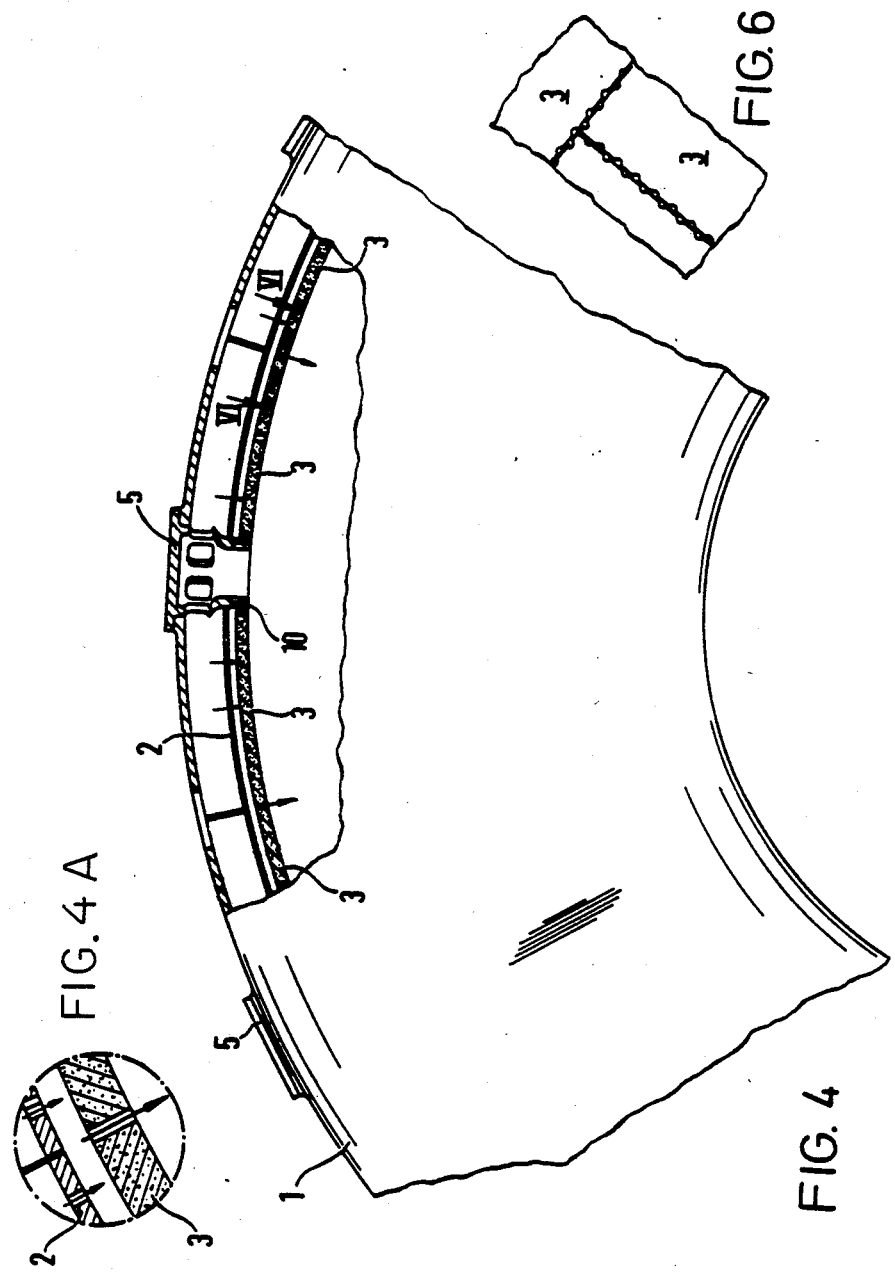

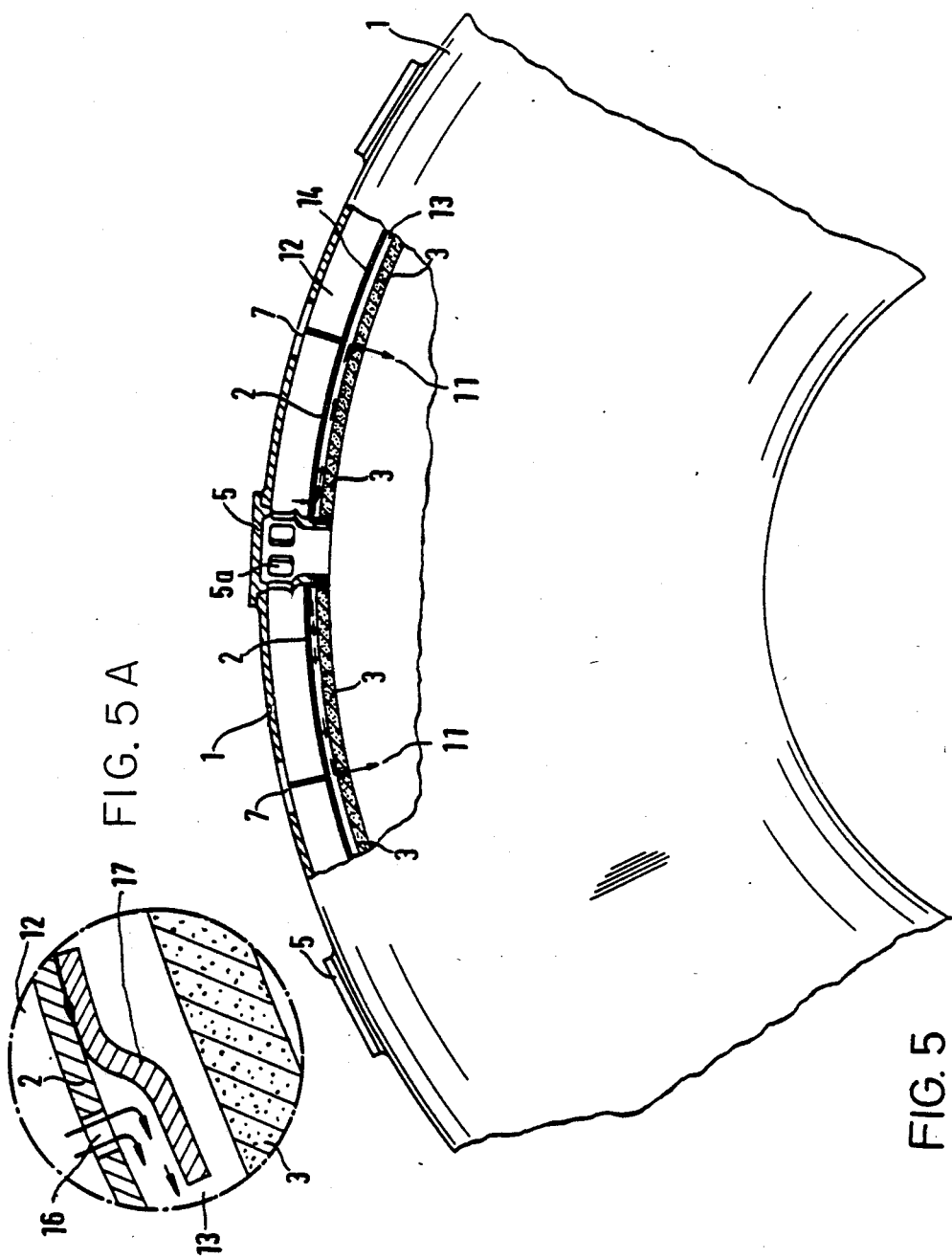

INTERNAL COMBUSTION CHAMBER ARRANGEMENT

This is a continuation, of application Ser. No. 870,371, filed June 4, 1986, now abandoned.

The present invention relates to an internal combustion chamber arrangement with a flame tube of high heat-resistant ceramic material having air supply openings which are arranged one behind the other distributed over the circumference in several rows in the direction of the reaction, preferably in several zones, so that the air flows radially into the flame tube from a space surrounding the combustion chamber and mixes with the fuel injected at the end face of the flame tube as a result of the turbulence inherent in the flow.

In one seeks to reduce the fuel consumption and environmental pollution with the same output, then one of the best known means therefore is the increase of the turbine inlet temperature. However, this has as a consequence also higher temperatures in the combustion chamber (approximately 1,800° to 2,000° K.). At such temperatures, also the ceramic material of a flame tube may appear brightly glowing. Temperature-resistant materials suitable therefor, such as sintered silicon carbide or also sintered and/or hot-pressed silicon nitride were used as flame tube material.

However, the mechanical connecting places with other materials are critical, especially when it involves sheet metal parts that are exposed to high temperatures. A transfer of the heat from the flame tube to the sheet metal part is thereby to be avoided to the greatest possible extent. One has therefore attempted to solve the problem by interposition of an insulation layer and/or cooling between the ceramic and the sheet metal part. However, on the one hand, the insulation layer stores heat and, on the other, it also exhibits a thermal expansion even though only a small thermal expansion.

The object of the present invention is to provide an internal combustion chamber arrangement, especially for gas turbines, whose flame tube on the one hand is high heat-temperature resistant and, on the other, has a mounting in the housing that withstands for a sufficiently long period of time the varied, especially thermal stresses of a rough operation.

The underlying problems are solved according to the present invention in that the flame tube is assembled of annularly shaped parts, whereby sheet metal mounting and support parts are so arranged between the outer walls of the annularly shaped flame tube parts and the metal walls, especially of a housing, without heat contact to the parts of the flame tube that a first and a second intermediate space is formed for peripheral partial flows of cooling air.

These and other objects, features and advantages of the present invention will become more apparent from the following description when taken in connection with the accompanying drawing which shows, for purposes of illustration only, two embodiments in accordance with the present invention and wherein:

FIG. 4 is a partial cross-sectional view, similar to FIG. 2, illustrating the principle of the combustion chamber in accordance with the present invention with jet impingement cooling at the sheet metal mounting members;

FIG. 4a is a detailed cross-sectional view, on an enlarged scale, illustrating the detail in the dash-and-dot circle of FIG. 4;

FIG. 5 is a partial cross-sectional view, similar to FIG. 2, illustrating the principle of the combustion chamber in accordance with the present invention with film cooling at the sheet metal mounting members;

FIG. 5a is an enlarged cross-sectional view illustrating the detail in the dash-and-dot line of FIG. 5; and FIG. 6 is a partial elevational view of the peripheral end faces of the ceramic segments as detailed (from FIG. 4) with their apertures for the cooling air outlet.

Figure 1:
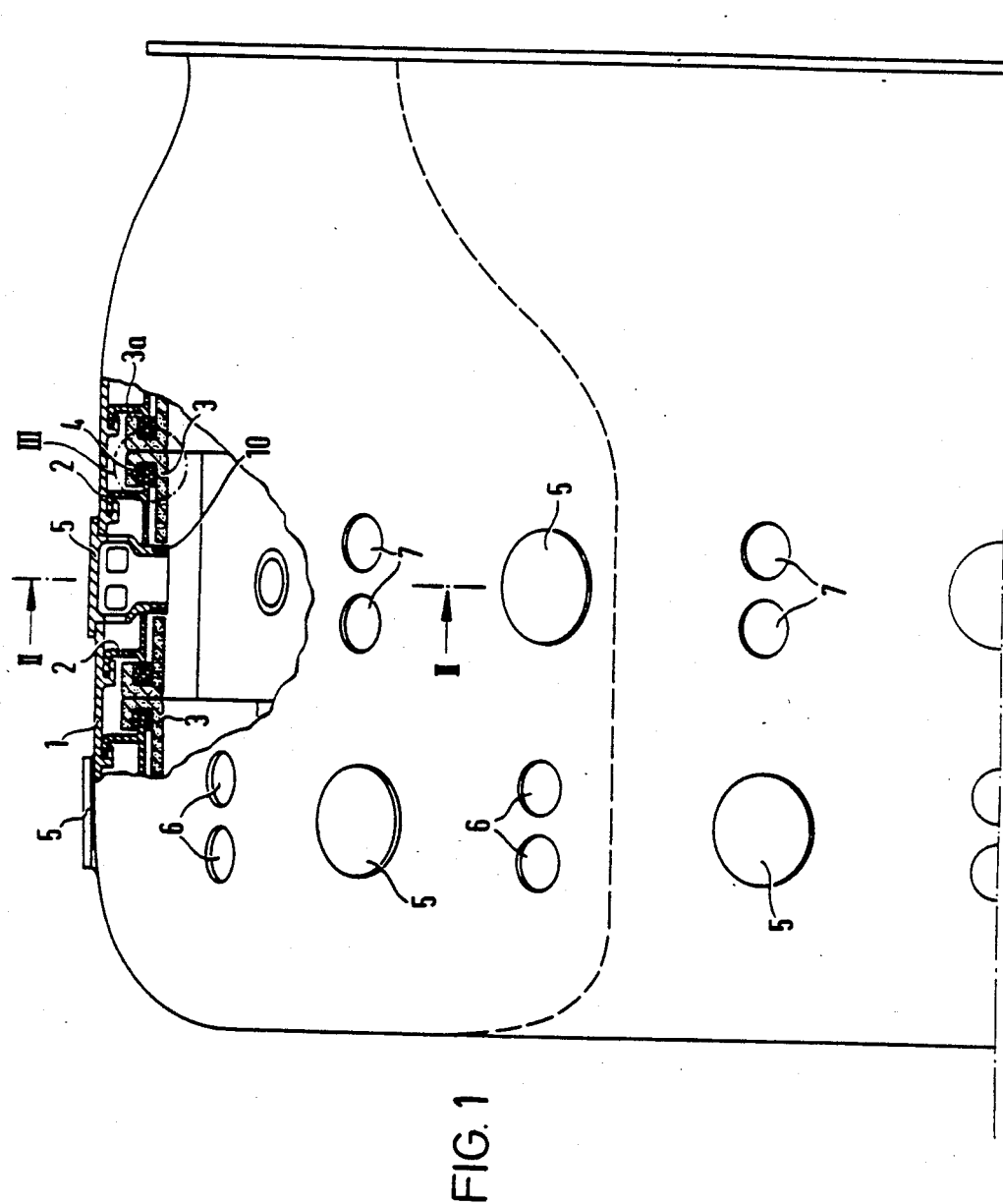
FIG. 1 is an elevational view, partly in cross section, of a pipe or annular combustion chamber in accordance with the present invention.
Figure 2:
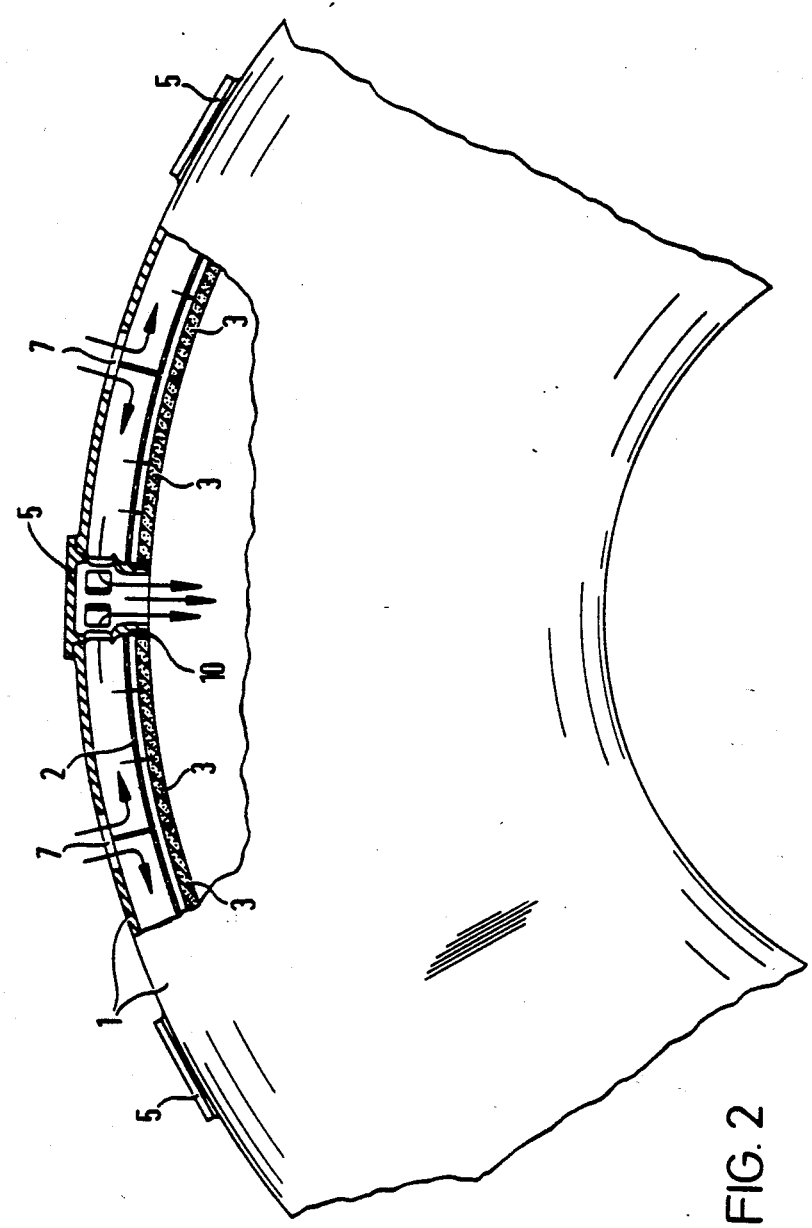
FIG. 2 is a partial cross-sectional view, taken along line II—II of FIG. 1 and illustrating the principle of the air supply into the combustion chamber in accordance with the present invention.
Figure 3:
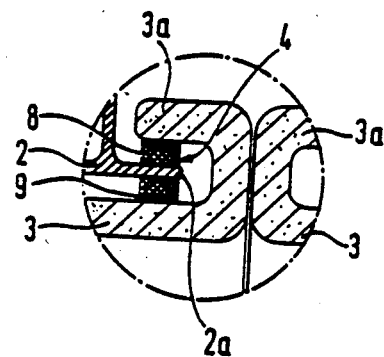
FIG. 3 is a partial cross-sectional view, on an enlarged scale, illustrating the detail of the suspension of the ceramic segments shown in the dash-and-dot circle III of FIG. 1.

Referring now to the drawing wherein like reference numerals are used throughout the various views to designate like parts, and more particularly to FIG. 1, the housing 1 of a pipe or annular combustion chamber of metallic materials is constructed as external housing, in which ceramic segments 3 are suspended by way of sheet metal mounting members 2, in the illustrated example, for a primary zone and a secondary zone and a third mixing zone. The (longitudinal) segments 3 are preferably subdivided into ring sectors (at 11 in FIG. 2, no closed rings). The ring sectors abut with their collars 3a, which are U-shaped in cross section, longitudinally at one another and include each within the area of this U an insulator generally designated by reference numeral 4 at the free end 2a of the sheet metal mounting member 2 and surround the same in the manner of a sealing strip or sealing bar. However, as shown in FIG. 3, it does not completely fill the space but instead permits lateral expansion movements (parallel to the main axis). The sheet metal mounting member 2 spaces the ceramic segments with respect to the external housing 1 in which it is suspended at 2b. Individual short pipe sections 5 are provided as air guide inserts centrally (transversely to the main axis) of the individual ceramic segments. An air guide insert preferably has no contact with the ceramic segment 3. The insert 5 is additionally provided with an insulating layer 10 at the places of passage through the part 3. The inserts 5 are preferably secured in the external housing 1 and are loosely surrounded by the sheet metal mounting member 2. They are externally closed like plugs. The sheet metal mounting member 2 is provided with a reflecting side, especially with an aluminum- or silver-layer or platinum applied by vapor deposition, which faces the ceramic segment 3. On the side opposite the ceramic segment 3, the spacing with resepct to the housing 1 creates a free space 12 (FIG. 2) in which air is conducted to the sheet metal mounting members 2, either (a) radially according to the principle of the jet impingement cooling (FIG. 4) or (b) tangentially according to the principle of the film cooling (FIG. 5)

flowing along the wall of the sheet metal mounting members 2 in the circumferential direction for their cooling on both sides by oppositely directed peripheral partial flows.

Additionally the opening rows 6 and 7 of the apertures for the air supply can be seen in the drawing (FIGS. 1 and 2), whereby the air supply is deflected from the outside peripherally to the combustion chamber, by way of openings 5a at the circumference of the short pipe sections 5. FIG. 3 illustrates the detail of the suspension for the ceramic segments 3 by means of the sheet metal mounting members 2 which, at least to the extent they protrude into the collar 3a of the segments 3, are covered at the strips 2a with wire mesh or with a metal felt 8 on which a sprayed-on zirconium oxide layer 9 is applied.

It is important with the present invention that a ceramic lining for the flame tube in a metal wall such as casing outer housing, support or the lke is not simply used, but that a first and second intermediate space are present, of which the latter is adjacent the ceramic components--like lining. The first intermediate space 12 serves essentially for the spacing of components with metallic and ceramic walls especially by reason of the differing thermal coefficients of expansion. However, it may also serve as air collector and distributor in that the main air stream enters into the outer housing through the openings 6 and 7, sweeps peripherally along the sheet metal mounting members 2 on the radially outer side thereof and only then enters jet-like into the combustion chamber through the short pipe sections 5.

The second intermediate space 13 has only a comparatively thin air layer. The latter is formed by a large number of small inlet opeings 14 (FIGS. 4 and 5) in the sheet metal mounting members 2. The air, after a peripheral external sweeping action, then enters in the radially outer wall of the ceramic ring segments 3 nearly in perpendicular direction with slight impact (throttled by the openings 14). It also sweeps along thereat and along the radial inner side of the sheet metal mounting members 2 until it leaves as small auxiliary air flow at the peripheral end faces 11 of the ring segments 3 through a large number of small openings 15 at the separating gaps or joints 11--as illustrated in FIG. 6.

FIG. 6 also shows that the ring segments are offset peripherally and longitudinally and more particularly in the manner of roof tiles. The thin air layer in the intermediate space 13 can also be formed in that the cooling air enters as auxiliary air flow according to FIG. 5 through a few openings 16 in proximity of the short pipe sections 5 and then is forced by means of the guide surface 17 to sweep peripherally along the radially inner sides of the sheet metal mounting members 2 as film in order to then cool also the same and the ring segments 3. Thereafter, the air again enters the combustion chamber through the large number of small openings at the separating joints 11 as illustrated in FIG. 6.

As a result of these measures, not only a particularly effective cooling of the sheet metal mounting members and the walls of the segments 3 is achieved, but also a thermo-shock at the hot ring segments, which are at a temperature of 1,800° to 2,00° K. is avoided.

While I have shown and described only two embodiments in accordance with the present invention, it is understood that the same is not limited thereto but is susceptible of numerous changes and modifications as known to a person skilled in the art. For example, all combinations of the described and illustrated features, both with one another as well as with other known features are part of the present invention. Additionally, changes of the illustrated and described embodiments are also possible without departing from the scope of the present invention. Consequently, I do not wish to be limited to the details shown and described herein but intend to cover all such changes and modifications as are encompassed by the scope of the appended claims.

I claim:

1. A combustion chamber, comprising a flame tube means of high heat-resistant ceramic material, a casing-like metallic ring-shaped wall means surrounding the flame tube means which forms a liner, while leaving an intermediate space, air feed openings in the flame tube means so that air flows radially into the flame tube means through a large number of short pipe sections, said pipe sections passing through openings in the flame tube means and aperture means in the metallic wall means, a mounting means for the ring segments of the ceramic flame tube means which is assembled of sheet metal members in the casing-like wall means for the ring segments in such a manner that neither the sheet metal mounting means nor short pipe sections for the air supply have heat contact with respect to the flame tube means and that the cooling air is so conducted that it enters into the casing-like means at first into an intermediate space with respect to the sheet metal members, sweeps peripherally along the same before it flows by way of the short pipe sections through openings in the flame tube means into the combustion chamber and thereby partial flows enter into a second intermediate space between the sheet metal members and the flame tube means, directly adjacent the flame tube means and cooling the sheet metal members and flame tube means.

2. A combustion chamber according to claim 1, wherein said combustion chamber is part of a gas turbine propulsion unit.

3. A combustion chamber arrangement for gas turbine propulsion units, comprising;

flame tube means of ceramic material defining a combustion space, said flame tube means comprising a plurality of ceramic parts disposed adjacent one another, metallic housing wall means surrounding the flame tube means to form air space means between the flame tube means and the housing wall means, sheet metal mounting wall means for mounting the ceramic parts of the flame tube means, said mounting wall means being disposed in between the housing wall means and the flame tube means and serving to subdivide the air space means into a first intermediate cooling air space at a side of the mounting wall means facing the housing wall means and a second intermediate cooling space at an opposite side of the mounting wall means facing the flame tube means, housing wall cooling air openings extending through the housing wall means and disposed at predetermined positions over the surface of the housing wall means for supplying cooling air to the first intermediate cooling air space, and cooling air guide means disposed at predetermined positions over the surface of the housing wall means at a spacing from the respective ones of said housing wall cooling air openings and including means for guiding cooling air flow in the first intermediate cooling air space in a peripheral direction over the surface of the mounting wall means and then through the flame tube means into the combustion space.

4. A combustion chamber arrangement according to claim 3, further comprising mounting wall cooling air openings for supplying cooling air from said first intermediate cooling air space to said second cooling air space.

5. A combustion chamber arrangement according to claim 4, further comprising cooling air deflecting means at said mounting wall cooling air opening for deflecting the cooling air flow from said first intermediate cooling air spaces so that said cooling air flows in a peripheral direction along the mounting wall means in said second intermediate cooling air space.

6. A combustion chamber arrangement according to claim 5, wherein openings are provided at junction planes of said ceramic parts for communicating cooling air from the second intermediate cooling air space to the combustion space.

7. A combustion chamber arrangement according to claim 3, wherein said ceramic parts are part annular ring shaped parts, wherein said sheet metal mounting wall means annularly surround the ceramic parts, said sheet metal mounting wall means including a reflecting coating on the side thereof facing the second intermediate cooling air space.

8. A combustion chamber arrangement according to claim 4, wherein said ceramic parts are part annular ring shaped parts, wherein said sheet metal mounting wall means annularly surround the ceramic parts, said sheet metal mounting wall means including a reflecting coating on the side thereof facing the second intermediate cooling air space.

9. A combustion chamber arrangement according to claim 5, wherein said ceramic parts are part annular ring shaped parts, wherein said sheet metal mounting wall means annularly surround the ceramic parts, said sheet metal mounting wall means including a reflecting coating on the side thereof facing the second intermediate cooling air space.

10. A combustion chamber arrangement according to claim 6, wherein said ceramic parts are part annular ring shaped parts, wherein said sheet metal mounting wall means annularly surround the ceramic parts, said sheet metal mounting wall means including a reflecting coating on the side thereof facing the second intermediate cooling air space.

11. A combustion chamber arrangement according to claim 7, wherein said cooling air guide means includes short radially extending pipe means extending from the housing wall means to respecting openings in said flame tube means, said pipe means including lateral openings communicating with the first intermediate cooling air space means.

12. A combustion chamber arrangement according to claim 6, wherein said cooling air guide means includes short radially extending pipe means extending from the housing wall means to respecting openings in said flame tube means, said pipe means including lateral openings communicating with the first intermediate cooling air space means.

13. A combustion chamber arrangement according to claim 5, wherein said cooling air guide means includes short radially extending pipe means extending from the housing wall means to respecting openings in said flame tube means, said pipe means including lateral openings communicating with the first intermediate cooling air space means.

* * * * *